(12) United States Patent
Kashibuchi et al.

(10) Patent No.: US 8,379,269 B2
(45) Date of Patent: Feb. 19, 2013

(54) IMAGE FORMING APPARATUS AND IMAGE FORMING METHOD FOR CORRECTING REGISTRATION DEVIATION

(75) Inventors: Yoichi Kashibuchi, Tokyo (JP); Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/898,229

(22) Filed: Oct. 5, 2010

(65) Prior Publication Data

US 2011/0109942 A1    May 12, 2011

(30) Foreign Application Priority Data

Nov. 6, 2009   (JP) .................... 2009-254988

(51) Int. Cl.
*H04N 1/405* (2006.01)
*H04N 1/409* (2006.01)
*H04N 1/58* (2006.01)

(52) U.S. Cl. ............... 358/3.03; 358/3.06; 358/3.26; 358/521; 358/534; 358/540

(58) Field of Classification Search ............. 358/1.9, 358/3.06, 3.26, 501, 504, 518, 521, 525, 358/530, 534–536, 540; 347/116, 131
See application file for complete search history.

(56) References Cited

U.S. PATENT DOCUMENTS

| | | | |
|---|---|---|---|
| 7,616,360 | B2 | 11/2009 | Otake et al. |
| 2007/0024880 | A1 | 2/2007 | Sato et al. |
| 2007/0046961 | A1 | 3/2007 | Kashibuchi et al. |
| 2009/0097072 | A1 | 4/2009 | Tamura |
| 2009/0323132 | A1 | 12/2009 | Yano et al. |
| 2010/0033778 | A1 | 2/2010 | Otake et al. |
| 2010/0097656 | A1 | 4/2010 | Misawa et al. |
| 2010/0128295 | A1 | 5/2010 | Tamura |

FOREIGN PATENT DOCUMENTS

JP    2004-170755    6/2004

OTHER PUBLICATIONS

U.S. Appl. No. 12/936,507, filed Oct. 5, 2010. Applicant: Hirokazu Tamura.

*Primary Examiner* — Scott A Rogers
(74) *Attorney, Agent, or Firm* — Fitzpatrick, Cella, Harper & Scinto

(57) ABSTRACT

Since a less-than-one-pixel-basis correction and a one-pixel-basis correction are constantly performed on an image after halftoning, unevenness in density disadvantageously occur depending on a halftoning method. According to the halftoning method, whether the less-than-one-pixel-basis correction is performed on a continuous tone image or the one-pixel-basis correction is performed on a halftone image is switched. The one-pixel-basis correction is constantly performed on the halftone image.

11 Claims, 19 Drawing Sheets

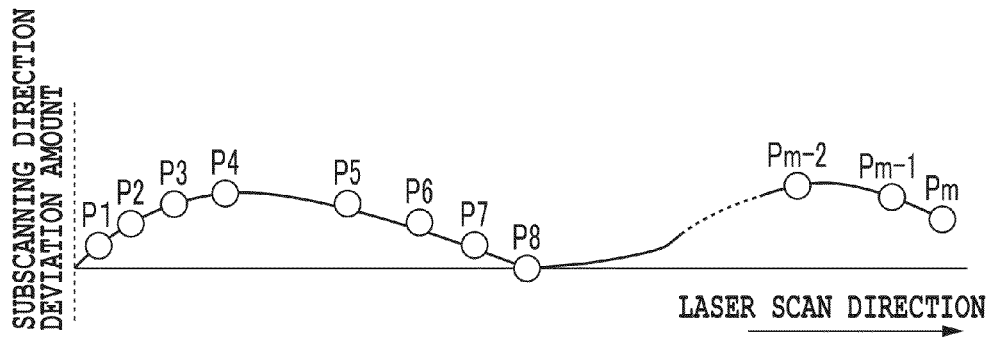
FIG.5A
| CHANGING POINT | P1 | P2 | P3 | P4 | P5 | P6 | P7 | P8 | ......... | Pm-2 | Pm-1 | Pm |
|---|---|---|---|---|---|---|---|---|---|---|---|---|
| DIRECTION | ↑ | ↑ | ↑ | ↓ | ↓ | ↓ | ↓ | ↑ | ......... | ↓ | ↓ | - |
FIG.5B
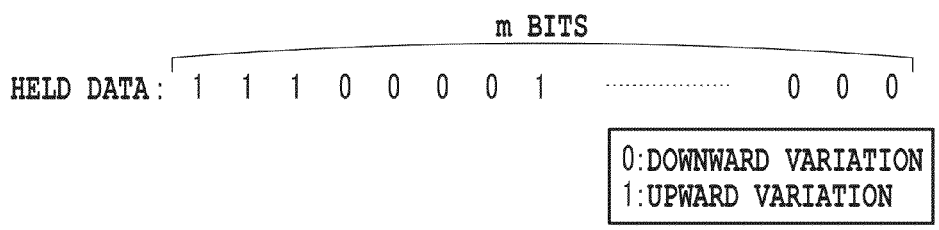
FIG.5C

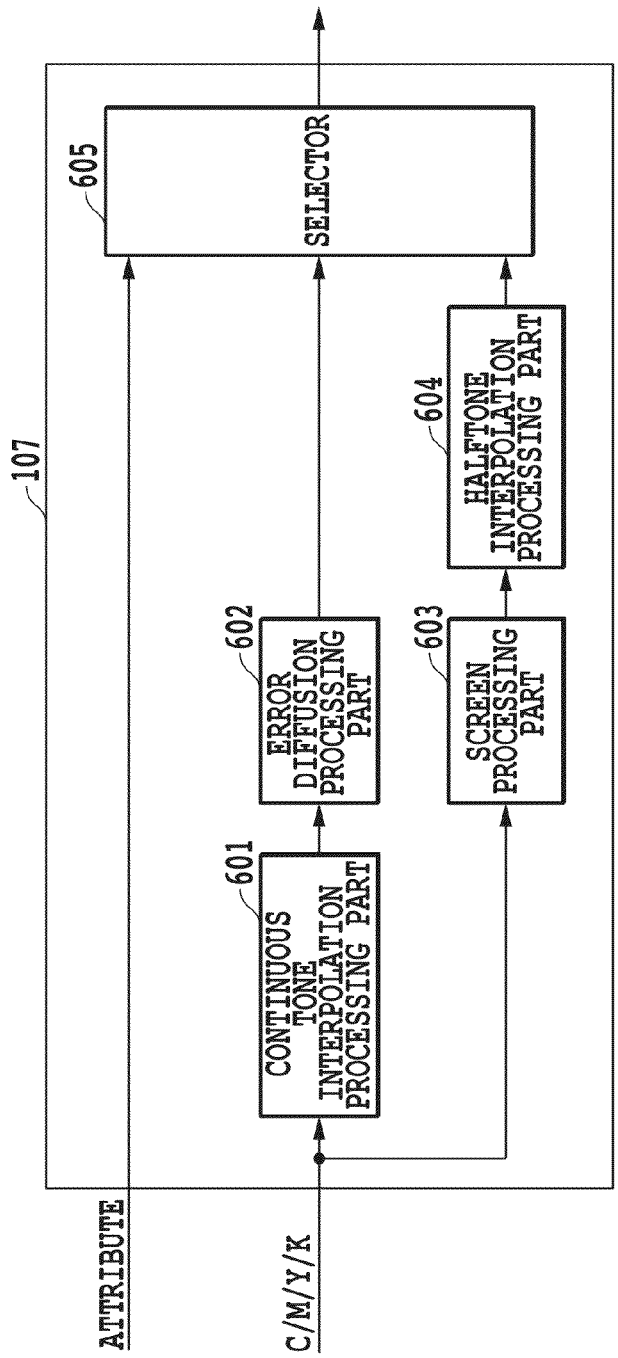

(a) INCLINATION DEVIATION AMOUNT 
(b) BITMAP IMAGE (BEFORE CORRECTION) 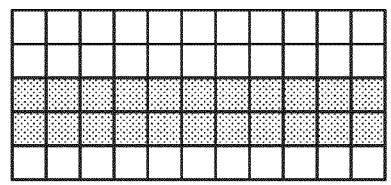
(c) CORRECTED BITMAP IMAGE 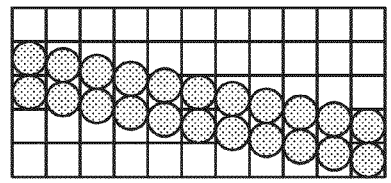
(d) BITMAP IMAGE (AFTER CORRECTION) 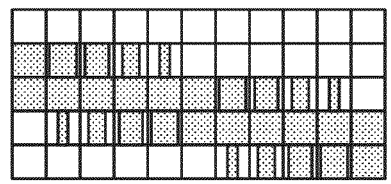
(e) EXPOSURE IMAGE 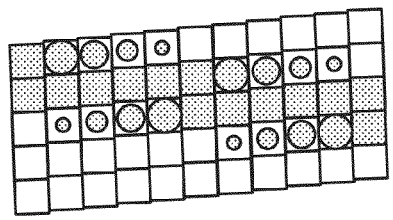
FIG.19

IMAGE FORMING APPARATUS AND IMAGE FORMING METHOD FOR CORRECTING REGISTRATION DEVIATION

BACKGROUND OF THE INVENTION

1. Field of the Invention

The present invention relates to an image forming apparatus for correcting registration deviation.

2. Description of the Related Art

As an image recording method used in a color image forming apparatus such as a color printer or a color copying machine, electrophotography is known. The electrophotography refers to a method of utilizing a laser beam to form a latent image on a photoconductive drum and performing development with charged color material (hereinafter referred to as "toner"). The recording of an image is performed by transferring an image developed with toner to transfer paper and fixing it.

In recent years, in order to increase the image formation speed of an electrophotographic color image forming apparatus, more and more tandem color image forming apparatuses have been used that have as many developing machines and photoconductive drums as the number of colors of toner and that sequentially transfer different color images on an image transport belt or a recording medium. In this tandem color image forming apparatus, a plurality of factors for causing registration deviation is known, and various methods of coping with each of the factors are proposed.

One of the factors is the nonuniformity or the fixing-position deviation of lens of a deflection scanning device, and attaching-position deviation of the deflection scanner against the main body of the color image forming apparatus. This position deviation causes a scanning line to be bent or curved, and the degree of the curve (hereinafter referred to as profile) varies from color to color, with the result that registration deviation occurs. The characteristic of the profile varies from image forming apparatus to image forming apparatus, that is, from recording engine to recording engine, and furthermore varies from color to color.

As a method of dealing with this registration deviation, there is a method of using an optical sensor to measure the inclination of a scanning line and the magnitude of the curve, correcting bitmap image data so as to perform cancellation and forming the corrected image (for example, see Japanese Patent Laid-Open No. 2004-170755). In this method, since processing is performed on image data to conduct electrical correction, a mechanical adjustment member and an adjustment step at the time of assembly are not necessary. Hence, it is possible to decrease the size of a color image forming apparatus and inexpensively deal with the registration deviation. This electrical registration deviation correction is divided into a one-pixel-basis correction and a less-than-one-pixel-basis correction.

The one-pixel-basis correction is performed by offsetting the pixel in the subscanning direction pixel by pixel according to the amount of correction of inclination and a curve. When this method is used, an image forming apparatus having a curve or inclination a few hundred to five hundred μm in size and a resolution of 600 dpi requires an image memory for a few tens of lines in order to perform the correction. In the following description, the position at which the pixel is offset is referred to as a changing point.

As shown in FIG. 19, the less-than-one-pixel-basis correction is performed by adjusting a tone value for image data with pixels in front and at the back in a subscanning direction. Specifically, when upward curving is present according to the profile, the image data before the correction is treated in the opposite direction to the direction indicated by the profile toward the side of the subscanning. By performing the less-than-one-pixel-basis correction in this way, it is possible to eliminate unnatural differences in height in the boundary of the changing point caused by the one-pixel-basis correction and thus smooth out the image.

However, in the method described above, the less-than-one-pixel-basis correction and the one-pixel-basis correction are constantly performed on an image after halftoning. Hence, unevenness in density disadvantageously occur depending on a halftoning method (for example, a processing method, such as error diffusion processing, by which to obtain a halftone image having a high spatial frequency).

SUMMARY OF THE INVENTION

An image forming apparatus of the present invention includes: an interpolation processing unit that performs less-than-one-pixel-basis pixel changing on image data having a number of tones of an M value; a halftone processing unit that converts the number of tones from the M value to an N value (M>N) in the image data on which the less-than-one-pixel-basis pixel changing has been performed; and a changing processing unit that performs one-pixel-basis pixel changing on the image data on which the less-than-one-pixel-basis pixel changing has been performed and which has been N-valued.

According to the present invention, since, for a processing method by which to obtain a halftone image having a high spatial frequency, such as error diffusion processing, interpolation processing is performed on a continuous tone image before halftoning, it is possible to achieve even density on image data coated at an even density. Moreover, image data on thin lines is prevented from being separated. Furthermore, since one-pixel-basis changing is constantly performed on a halftone image having a smaller amount of data than the continuous tone image, it is possible to minimize the cost for the one-pixel changing.

Further features of the present invention will become apparent from the following description of exemplary embodiments (with reference to the attached drawings).

BRIEF DESCRIPTION OF THE DRAWINGS

FIGS. 5A to 5C are diagrams showing a method of storing data on the profile characteristic;

FIG. 6 is a block diagram showing a first configuration of a HT processing part;

FIG. 19 is a diagram showing an example of less-than-one-pixel-basis correction processing.

DESCRIPTION OF THE EMBODIMENTS

The preferred embodiments of the present invention will be described below with reference to the accompanying drawings.

Embodiment 1

Figure 1:
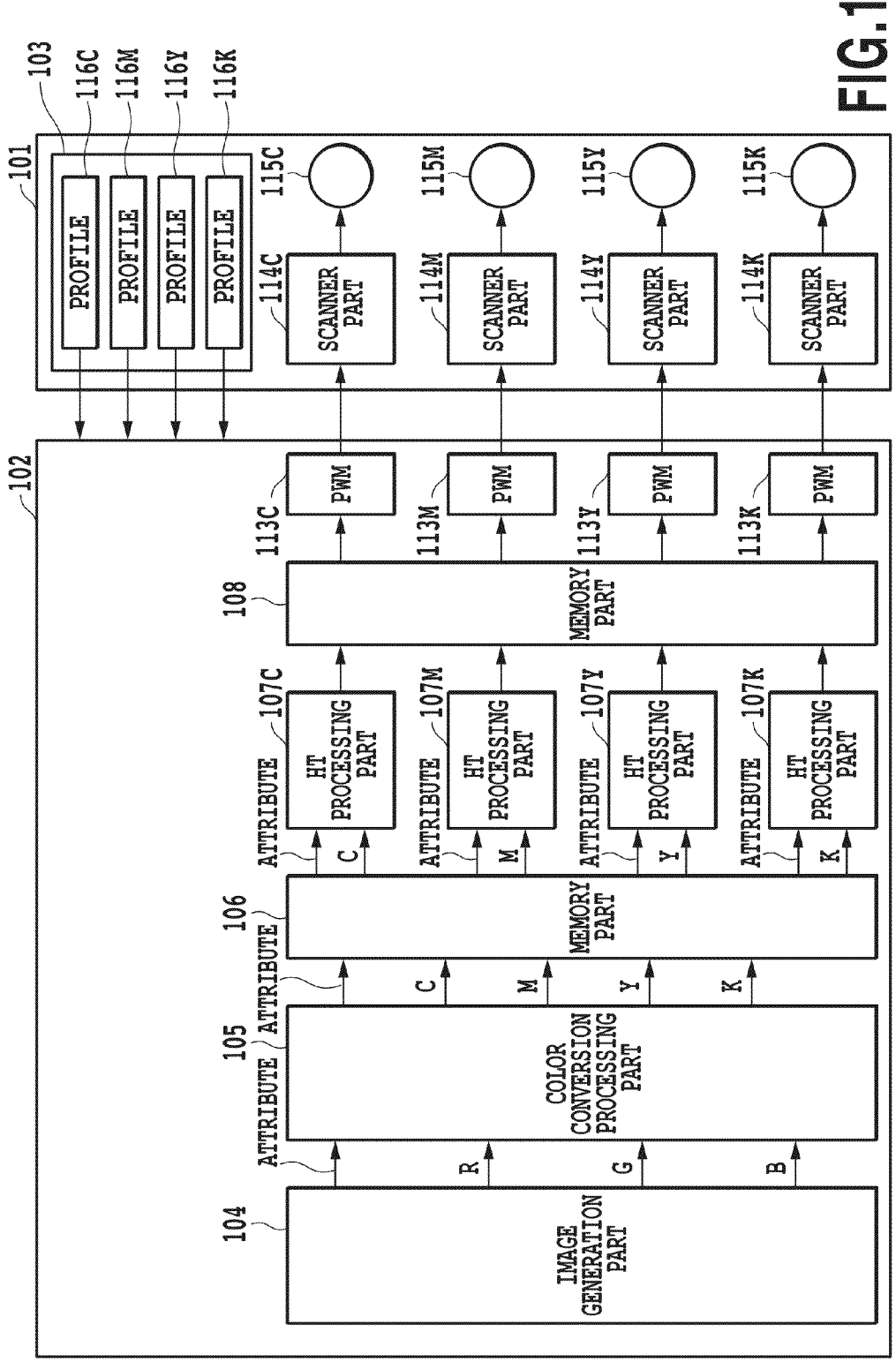
FIG. 1 is a block diagram showing the configuration of an image forming apparatus.
Figure 2:
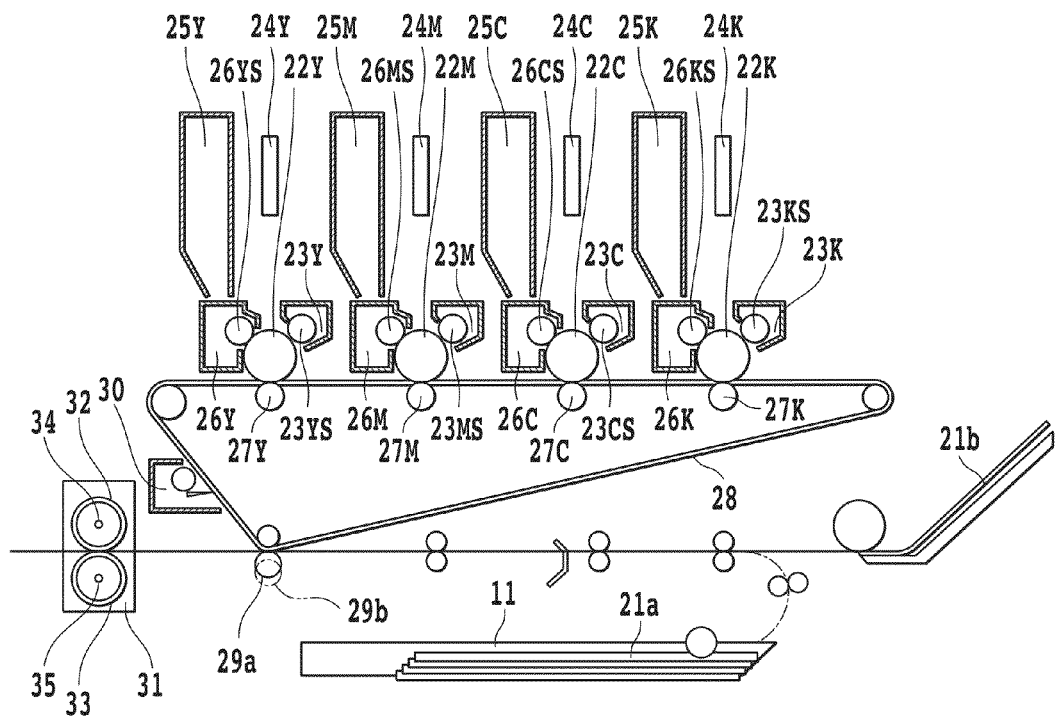
FIG. 2 is a cross-sectional view of the image forming apparatus.

FIG. 1 is a diagram illustrating the configuration of blocks related to the production of an electrostatic latent image in an electrophotographic color image forming apparatus of this embodiment. The color image forming apparatus is composed of an image formation part 101 and an image processing part 102; the image processing part 102 generates bitmap image information, and, based on it, the image formation part 101 forms an image on a recording medium. FIG. 2 is a cross-sectional view of a tandem electrophotographic color image forming apparatus employing an intermediate transfer member 28. The operation of the image formation part 101 in the electrophotographic color image forming apparatus will be described using FIGS. 1 and 2.

According to an exposure time during which the image processing part 102 performs processing, the image formation part 101 drives exposure light, forms an electrostatic latent image, develops this electrostatic latent image and forms a monochromatic toner image. These monochromatic toner images are superimposed on each other to form a multicolor toner image, and this multicolor toner image is transferred to a recording medium 11 of FIG. 2 and the multicolor toner image on the recording medium is fixed.

Reference numerals 23Y, 23M, 23C and 23K shown in FIG. 2 represent injection charging devices; four injection charging devices are provided to charge photoconductive members 22Y, 22M, 22C and 22K for colors of Y, M, C and K, respectively. The injection charging devices include sleeves 23YS, 23MS, 23CS and 23KS.

The photoconductive members 22Y, 22M, 22C and 22K are rotated by the transmission of the drive force of an unillustrated drive motor; the drive motor rotates the photoconductive members 22Y, 22M, 22C and 22K according to the image formation operation in a counterclockwise direction. An exposure component applies the exposure light to the photoconductive members 22Y, 22M, 22C and 22K from scanner parts 24Y, 24M, 24C and 29K, selectably exposes the surface of the photoconductive members 22Y, 22M, 22C and 22K, and thus forms the electrostatic latent image.

In order to visualize the electrostatic latent image, four developing devices 26Y, 26M, 26C and 26K shown in FIG. 2 are provided to perform development for colors of Y, M, C and K, respectively; the developing devices include sleeves 26YS, 26MS, 26CS and 26KS. Each developing device 26 is removable.

The intermediate transfer member 28 of FIG. 2 rotates in a clockwise direction in order to receive the monochromatic toner image from the photoconductive member 22; as the photoconductive members 22Y, 22M, 22C and 22K and primary transfer rollers 27Y, 27M, 27C and 27K arranged opposite the photoconductive members rotate, the monochromatic toner image is transferred. An appropriate bias voltage is applied to the first primary roller 27, and a difference is made between the rotation speed of the photoconductive member 22 and the rotation speed of the intermediate transfer member 28. Thus, the monochromatic toner image is effectively transferred onto the intermediate transfer member 28. This is called a primary transfer.

Furthermore, the monochromatic toner images of individual stations are superimposed on the intermediate transfer member 28. The superimposed multicolor toner image is transported to a secondary transfer roller 29 as the intermediate transfer member 28 rotates. Simultaneously, the recording medium 11 is sandwiched and transported from a paper feed tray 21 to the secondary transfer roller 29, and the multicolor toner image on the intermediate transfer member 28 is transferred to the recording medium 11. Here, an appropriate bias voltage is applied to the secondary transfer roller 29, and thus the toner image is electrostatically transferred. This is called a secondary transfer. While the secondary transfer roller 29 transfers the multicolor toner image onto the recording medium 11, the secondary transfer roller 29 comes in contact with the recording medium 11 at a position 29a; after printing processing, the secondary transfer roller 29 moves apart to a position 29b.

In order to fuse the multicolor toner image transferred to the recording medium 11 into the recording medium 11, a fixing device 31 includes a fixing roller 32 for heating the recording medium 11 and a pressure roller 33 for pressing the recording medium 11 onto the fixing roller 32. The fixing roller 32 and the pressure roller 33 are formed to be hollow, and incorporate heaters 34 and 35 into them, respectively. The fixing device 31 transports the recording medium 11 holding the multicolor toner image with the fixing roller 32 and the pressure roller 33, and applies heat and presser to fix the toner into the recording medium 11.

The recording medium 11 into which the toner has been fixed is then ejected by an unillustrated ejection roller to an unillustrated ejection tray, with the result that the image formation operation is completed. A cleaning component 30 is provided to perform cleaning on the remaining toner left on the intermediate transfer member 28; the waste toner left after the multicolor (four-color) toner image formed on the intermediate transfer member 28 is transferred to the recording medium 11 is stored in a cleaner container.

Figure 3A:
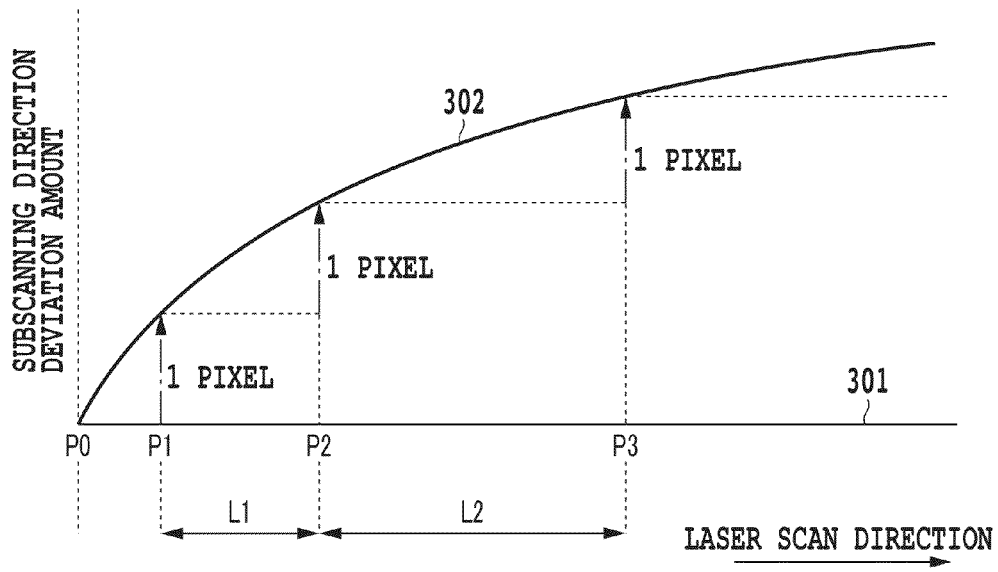
FIGS. 3A and 3B are diagrams showing an example of the profile characteristic of the image forming apparatus.
Figure 3B:
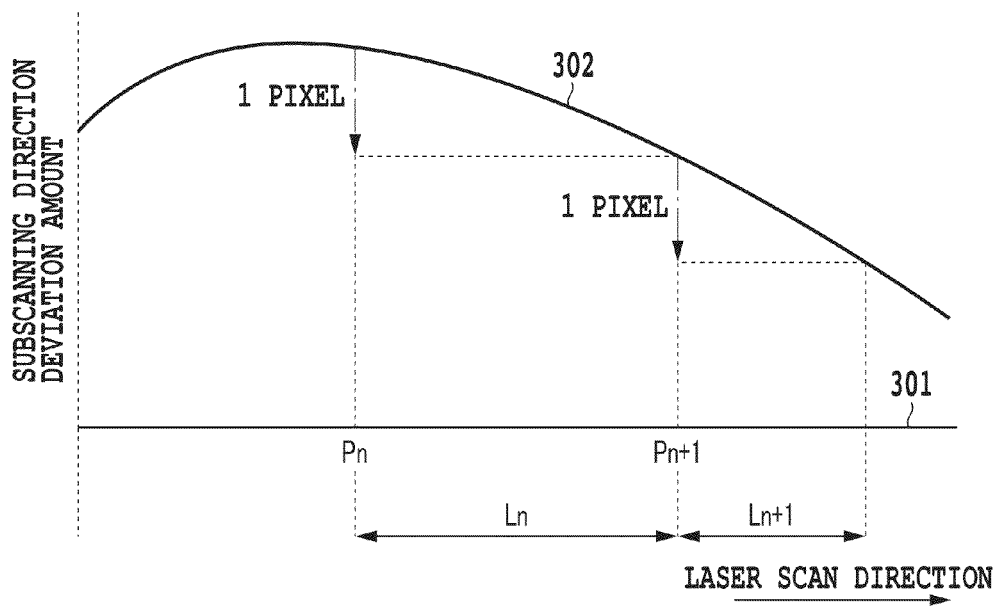

The profile characteristic of a scanning line for each of the colors in the image forming apparatus will now be described using FIGS. 3A, 3B, 4A to 4D and 5A to 5C. FIG. 3A is a diagram showing, as the profile characteristic of the image forming apparatus, a region deviated upward (in a vertical direction) with respect to a laser scan direction. FIG. 3B is a diagram showing, as the profile characteristic of the image forming apparatus, a region deviated downward (in a vertical direction) with respect to a laser scan direction. Reference numeral 301 represents an ideal scanning line; it shows a characteristic when scanning is performed vertically with respect to the rotation direction of the photoconductive member 22.

Figure 4A:
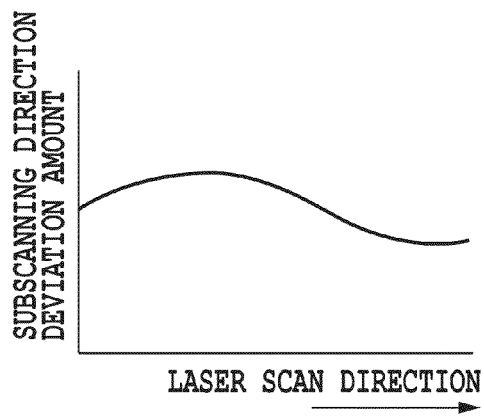
FIGS. 4A to 4D are diagrams showing the relationship between the deviation of the image forming apparatus and the direction of correction.
Figure 4B:
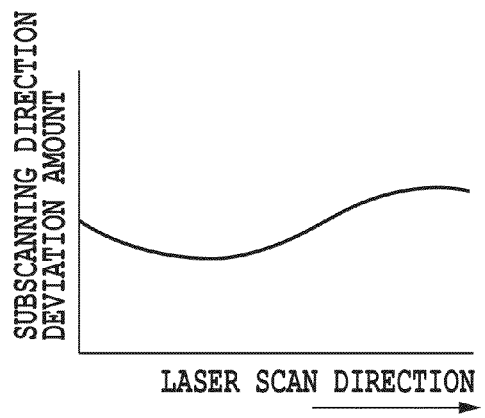
Figure 4C:
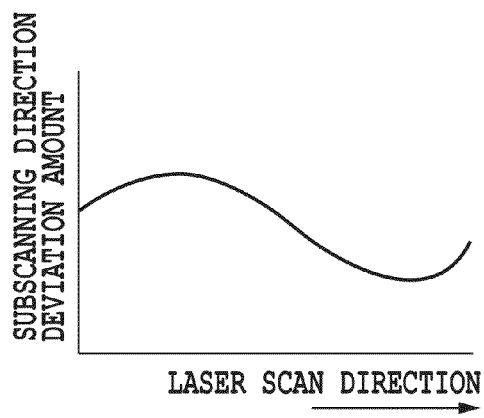
Figure 4D:
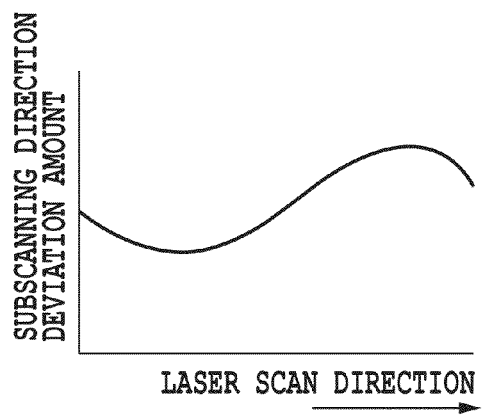

The profile characteristic will be described below based on the direction needed to be corrected by the image processing part 102; the definition of the profile characteristic is not limited to this. Specifically, the profile characteristic is defined as the direction of deviation of the image formation part 101, and the image processing part 102 may correct the characteristic opposite to it. In FIGS. 4A to 4D are shown a correlation between a diagram showing the direction needed to be corrected by the image processing part 102 according to the definition of the profile and a diagram showing the direction of displacement of the image formation part 101. When the profile characteristic as shown in FIG. 4A is indicated as the direction needed to be corrected by the image processing part 102, the curving characteristic of the image formation part 101 is one that is shown in FIG. 4B as the opposite direction. In contrast, when the profile characteristic shown in FIG. 4C is indicated as the curving characteristic of the image formation part 101, the direction needed to be corrected by the image processing part 102 is one that is shown in FIG. 4D.

For example, as shown in FIGS. 5A to 5C, as a method of holding data on the profile characteristic, the position of a pixel at a changing point in a main scanning direction and the direction of variation up to the successive changing point are held. Specifically, changing points P1, P2, P3, . . . and Pm are defined on the profile characteristic of FIG. 5A. Each of the changing points is defined as a point that is deviated one pixel in a subscanning direction; with respect to directions, there are two cases, one in which an upward variation is produced up to the successive changing point and the other in which a downward variation is produced.

For example, the changing point P2 is a point at which changing needs to be performed in an upward direction up to the successive changing point P3. Hence, the direction in which the changing is performed at P2 is an upward direction (↑) as shown in FIG. 5B. Likewise, the direction in which the changing is performed at P3 is an upward direction (↑) up to the successive changing point P4. By contrast to the direction mentioned above, the direction in which the changing is performed at the changing point P4 is a downward direction (↓). When, for example, data indicating an upward direction is assumed to be "1" and the data indicating a downward direction is assumed to be "0", the method of holding data indicating the direction is one that is shown in FIG. 5C. In this case, the number of pieces of data held is equal to the number of changing points; when the number of changing points is m, the number of bits held is m.

With reference back to FIGS. 3A and 3B, reference numeral 302 represents an actual scanning line in which inclination and curving are produced that results from the position accuracy of the photoconductive member 22 and the deviation of its diameter and the position accuracy of an optical system in the scanner part 24 (24C, 24M, 24Y and 24K) of each color. The image forming apparatus has the different profile characteristic for each of its recording devices (recording engines); the color image forming apparatus has the different characteristic for each color.

The changing point of a region deviated upward with respect to the laser scan direction will now be described using FIG. 3A.

In this embodiment, the changing point refers to a point that is deviated one pixel in the subscanning direction. Specifically, in FIG. 3A, points P1, P2 and P3 deviated one pixel in the subscanning direction on an upward curving characteristic 302 correspond to the changing points. FIG. 3A is shown with reference to P0. As obvious from the figure, the distance (L1, L2) between the changing points is short in a region where the curving characteristic 302 rapidly varies, whereas the distance is long in a region where it slightly varies.

The changing point of a region deviated downward with respect to the laser scan direction will now be described using FIG. 3B. Even in a region indicating the characteristic of a downward deviation, the changing point is defined as a point that is deviated one pixel in the subscanning direction. Specifically, in FIG. 3B, points Pn and Pn+1 deviated one pixel in the subscanning direction on a downward curving characteristic 302 correspond to the changing points. As in FIG. 3A, in FIG. 3A, the distance (Ln, Ln+1) between the changing points is short in a region where the curving characteristic 302 rapidly varies, whereas the distance is long in a region where it slightly varies.

As described above, the changing point is closely connected with the degree of variation of the curving characteristic 302 of the image forming apparatus. Hence, in the image forming apparatus having a rapidly varying curving characteristic, a large number of changing points are present whereas, in the image forming apparatus having a slightly varying curving characteristic, a smaller number of changing points are present.

As described previously, since the curving characteristic 302 of the image forming apparatus varies from color to color, the number of changing points and their positions vary from color to color. These differences between the colors cause registration deviation in an image obtained by transferring toner images of all colors onto the intermediate transfer member 28.

The processing performed by the image processing part 102 in the color image forming apparatus will now be described using FIG. 1. An image generation part 104 generates raster image data enabling printing processing from printing data received from an unillustrated computer device or the like, and outputs it as attribute data indicating RGB data and the data attribute of each pixel. The attribute data holds attributes such as characters, thin lines, CG and natural images. The image generation part 104 does not deal with the image data received from the computer device or the like, and may deal with image data from a reading component that is formed within the color image forming apparatus. The reading component described here includes at least a CCD (charged couple device) or a CIS (contact image sensor). In addition, the reading component may also include a processing part for performing predetermined image processing on the read image data. Without the reading component being formed within the color image forming apparatus, the data may be received from the reading component through an unillustrated interface.

Reference numeral 105 represents a color conversion part; the RGB data is converted into CMYK data according to the toner color of the image formation part 101, and the CMKY data and the attribute data are stored in a bitmap memory 106. A memory part 106 is a first memory part formed in the image processing part 102, and temporarily stores the raster image data for the printing processing. The memory part 106 may be formed with a page memory for storing image data of one page or may be formed with a band memory for storing data of a plurality of lines.

Reference numerals 107C, 107M, 107Y and 107K represent a HT (halftoning) processing part; they perform interpolation processing for less-than-one-pixel-basis changing and halftoning on the attribute data and data of each color output from the memory part 106. In the interpolation processing performed by the HT processing part 107, pixels preceding and succeeding the changing point corresponding to the curving characteristic of the image forming apparatus are used. The interpolation processing and the halftoning will be described in detail later.

Reference numeral 108 represents a second memory part formed within the image forming apparatus; it stores N-valued data on which the HT processing part 107 (107C, 107M, 107Y and 107K) has performed processing. When the pixel position where image processing is performed after the memory part 108 is a changing point, one-pixel-basis changing is performed at the time of reading of the memory part 108. Since one-pixel-basis changing is performed on the N-valued data on which the HT has performed N-valuing (M>N) processing although it is M-valued data before the HT processing, a small amount of processing cost (arithmetic capacity and the memory capacity of the memory part 108) is only necessary. The one-pixel-basis changing performed by the memory part 108 will be described in detail later. Although this embodiment deals with a case where the first memory part 106 and the second memory part 108 are separately formed, a common memory part may be formed within the image forming apparatus.

Figure 12A:
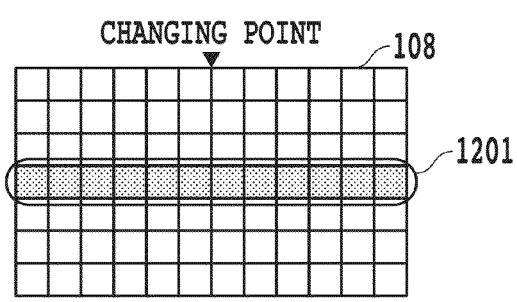
FIGS. 12A to 12C are diagrams schematically showing the state of data stored in a memory part.
Figure 12B:
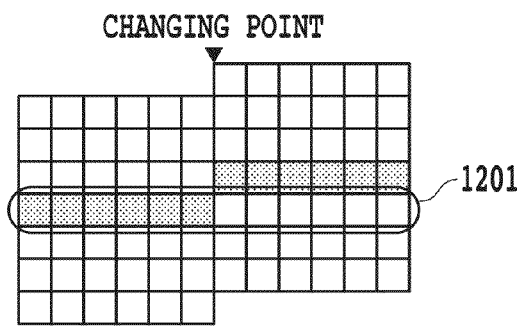
Figure 12C:
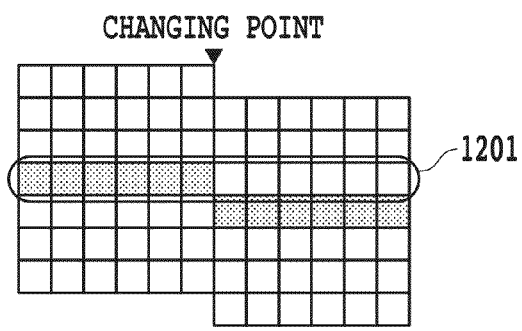

FIG. 12A is a diagram schematically showing the state of data held by the memory part 108. As shown in FIG. 12A, in the state where the memory part 108 stores the data, irrespective of the direction in which the changing is performed in the image processing part 102 and the curving characteristic of the image formation part 101, the data on which the HT processing part 107 has performed processing is held. When the profile characteristic, that is, the direction needed to be corrected by the image processing part 102 at the time of reading of line 1201 show in FIG. 12A, is an upward direction, as shown in FIG. 12B, with the changing point being a boundary, the state where one-pixel displacement is performed in an upward direction is produced. When the profile characteristic, that is, the direction needed to be corrected by the image processing part 102, is a downward direction, at the time of reading of the image data of line 1201 from the memory part 108, as shown in FIG. 12C, with the changing point being the boundary, the state where one-pixel displacement is performed in a downward direction is produced.

Reference numeral 113 represents a pulse width modulation (PWM); it converts the image data of each color read from the memory part 108 by performing one-pixel-basis changing into data corresponding to the exposure times of scanner parts 115C, 115M, 115Y and 115K. Then, the converted image data is output by the printing part 115 of the image formation part 101.

According to FIG. 5C, the profile characteristic data that has already been described is held as the characteristic of the image forming apparatus in the image formation part 101 within the apparatus. The image processing part 102 performs processing according to the profile characteristic held by the image formation part 101 (profiles 116C, 116M, 116Y and 116K).

The operation of the HT processing part 107 (107C, 107M, 107Y and 107K) in the image processing part 102 will now be described in detail using FIG. 6. All the HT processing parts 107C, 107M, 107Y and 107K can have the same configuration, and hence they will be described below as the HT processing part 107.

The HT processing part 107 receives image data corresponding each color from CMYK data and attribute data (attribute information), and feeds the image data to a continuous tone interpolation processing part (first interpolation processing part) 601 and a screen processing part (second halftone processing part) 603. The continuous tone interpolation processing part 601 that has received the image data performs the interpolation processing for the less-than-one-pixel-basis changing on the image data holding a continuous tone before halftoning (hereinafter referred to as a continuous tone image). In the interpolation processing performed by the continuous tone interpolation processing part 601, the pixels preceding and succeeding the changing point corresponding to the curving characteristic of the image forming apparatus are used. The interpolation processing will be described in detail later.

Then, in order to convert an interpolated continuous tone image into image data (hereinafter, a halftone image) having a halftone of a smaller number of tones, an error diffusion processing part (first halftone processing part) 602 performs halftoning using an error diffusion method. In other words, the number of tones of the image data is changed from an M-value to an N-value (M>N). The error diffusion method is a method of performing N-valuing by comparing image data that has been input with a predetermined threshold value and diffusing a difference between the image data and the threshold value over the ambient pixels to be subjected to N-valuing processing later. Although, in this embodiment, the error diffusion processing part uses the error diffusion method, the present invention is not limited to this as long as the method is a halftoning method, such as an average error minimizing method or an average density storage method, that has low periodicity and has relatively diffused dots.

In order to convert the continuous tone image into the halftone image of a smaller number of tones, a screen processing part 603 receives the image data and performs halftoning through screen processing. In other words, the number of tones of the image data is changed from the M-value to the N-value (M>N). The screen processing is performed by a dither method of arbitrarily reading a threshold value from a dither matrix where a plurality of threshold values is arranged and performing N-valuing by comparing image data that has been input with the threshold value. In an electrophotographic color image forming apparatus, in order to achieve stable dot reproducibility on a recording medium, a dither matrix where dots are concentrated is periodically used.

Then, a halftone interpolation processing part (second interpolation processing part) 604 performs the interpolation processing for less-than-one-pixel-basis changing on the halftone image on which the screen processing part has performed halftoning. The interpolation processing performed by the halftone interpolation processing part 604 is basically the same as that performed by the continuous tone interpolation processing part 601, but differs in that the interpolation processing is performed on a halftone image whose number of tones is reduced by halftoning. As with the interpolation processing performed by the continuous tone interpolation processing part 601, the halftone interpolation processing part 604 uses the pixels preceding and succeeding the changing point corresponding to the curving characteristic of the image forming apparatus. The interpolation processing will be described in detail later.

Finally, a selector (selection part) 605 selects either the image data output from the error diffusion processing part 602 or the image data output from the halftone interpolation processing part 604 according to the attribute data, and outputs the selected image data. In this embodiment, when the pixel has the attributes of characters and thin lines, the image data output from the error diffusion processing part 602 is selected and output whereas, when the pixel has the attributes of CG and natural images other then those mentioned above, the image data output from the halftone interpolation processing part 604 is elected and output. In other words, the selector 605 selects and outputs the first image data output from the error diffusion processing part 602 for image data relatively having high-frequency components, and selects and outputs the second image data output from the halftone interpolation processing part 604 for image data relatively having low-frequency components. The selection of the image data for the attribute data is not limited to this method; for example, it goes without saying that, when the pixel has the attribute of natural images, the image data output from the error diffusion processing part 602 may be output. As described above, in this embodiment, it is possible to switch, according to the attribute data, the timing when the interpolation processing for the less-than-one-pixel-basis changing is performed between in a stage preceding the halftoning processing and in a stage succeeding it.

The example where, in the configuration of FIG. 6, the selector 605 is arranged in a stage succeeding the error diffusion processing part 602 and the halftone interpolation processing part 604 and the outputs from individual parts are selected is described. However, the selector 605 may be arranged in a stage preceding the error diffusion processing part 602 and the halftone interpolation processing part 604, and control may be performed such that the outputs of the image data supplied to the individual parts are selected according to the attributes.

Figure 7:
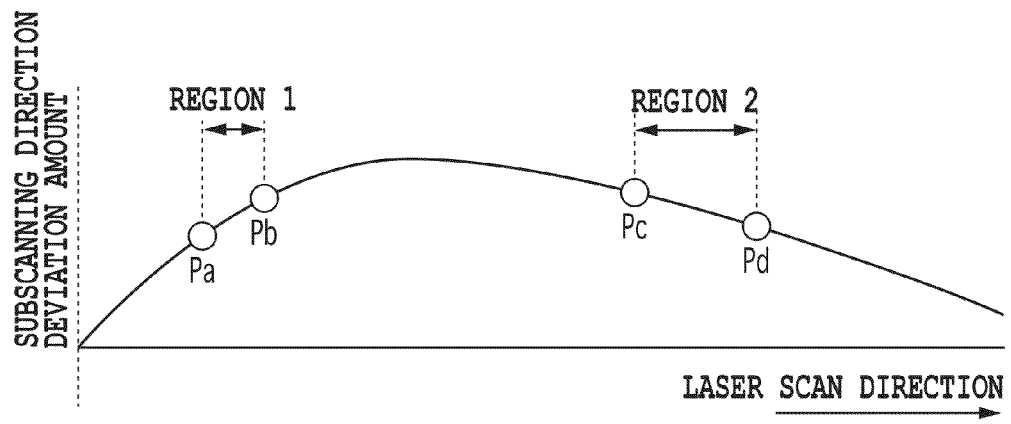
FIG. 7 is a diagram showing an example of changing points and interpolation processing regions.
Figure 8:
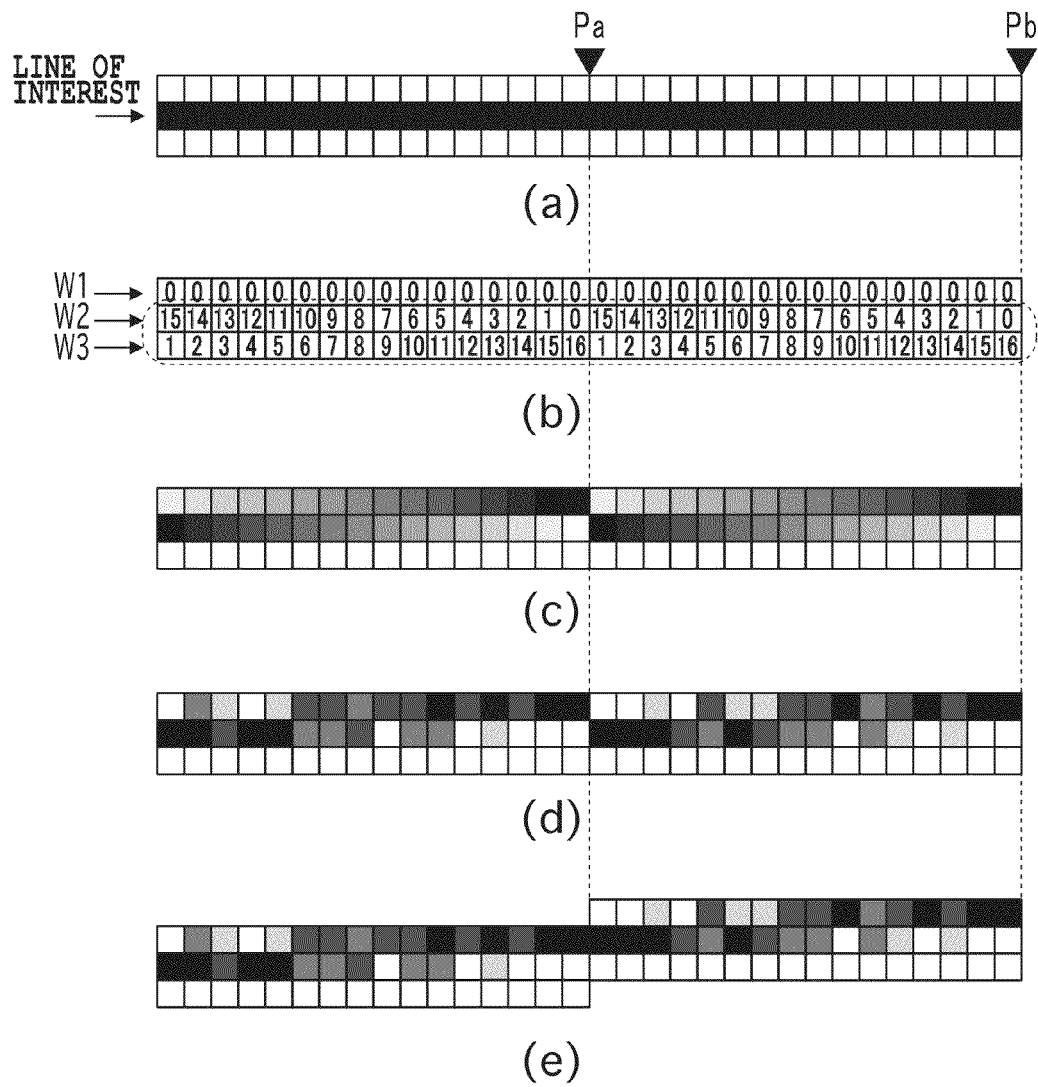
FIG. 8 is a diagram schematically showing processing on pixel changing.
Figure 9:
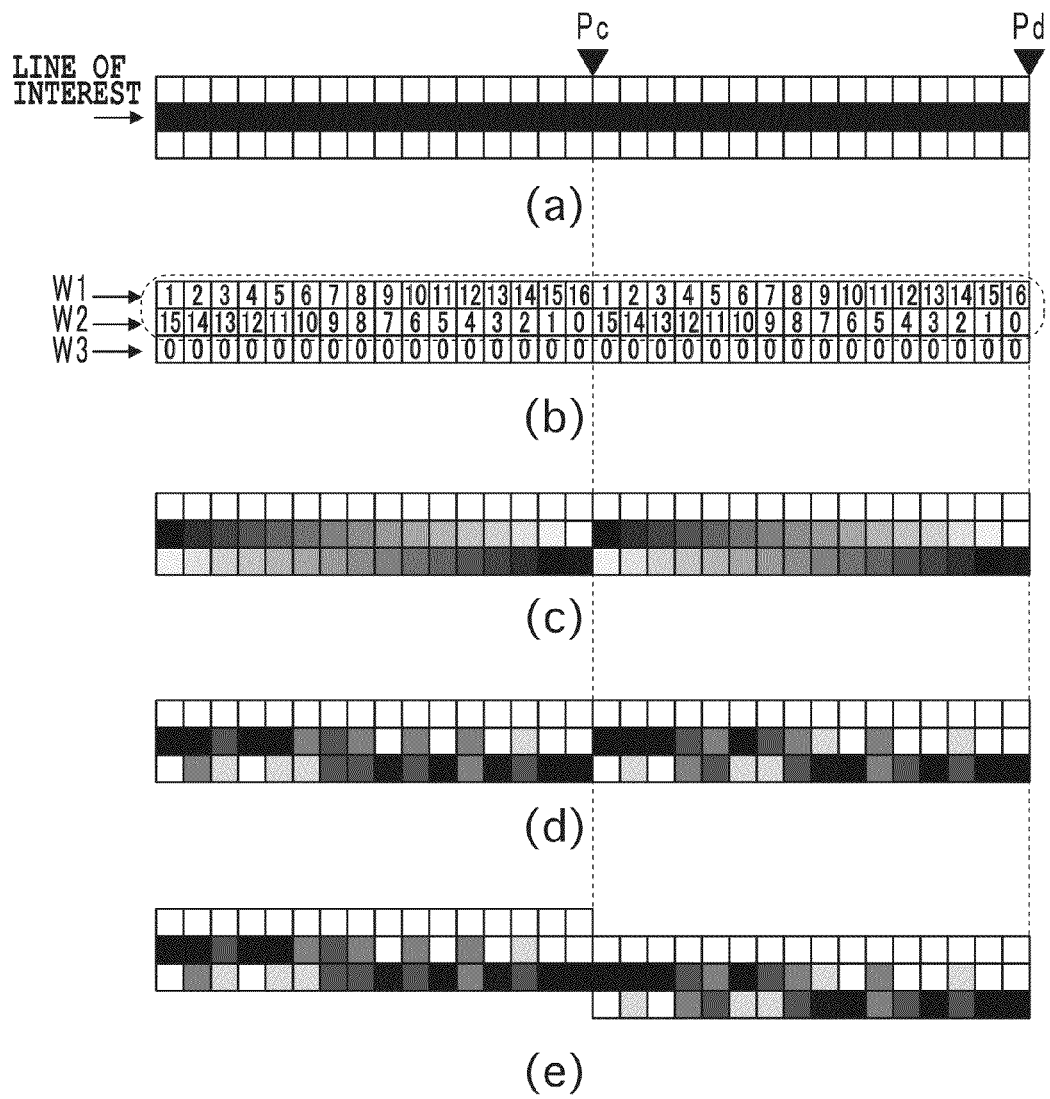
FIG. 9 is a diagram schematically showing processing on the pixel changing.

The interpolation processing performed by the continuous tone interpolation processing part 601, that is, the processing for less-than-one-pixel-basis changing will now be described using FIGS. 7, 8 and 9. FIG. 7 is a diagram schematically showing the changing points and the interpolation regions in this embodiment. FIGS. 8 and 9 are diagrams schematically showing the interpolation processing for less-than-one-pixel-basis changing performed by the continuous tone interpolation processing part 601 and the one-pixel-basis changing performed by the memory part 108.

FIG. 7 is a diagram showing the curving characteristic of the image forming apparatus in the laser scan direction. It is assumed that region 1 is a region needed to be corrected upward by the image processing part 102 whereas region 2 is a region needed to be corrected downward by the image processing part 102. For convenience of description, in the following description of the interpolation processing, the minimum space between the changing points is assumed to be 16 pixels; the present invention is not limited to this. That is, a space of any number of pixels may be used, or a power-of-two pixel space may be used to reduce the circuit configuration.

An image before the interpolation processing preceding and succeeding the changing point Pa in the example of FIG. 7, that is, the image data which is input to the continuous tone interpolation processing part 601, is shown by (a) in FIG. 8. The line of interest is the center line of the image data of three lines shown in the figure.

The continuous tone interpolation processing part 601 performs the interpolation processing for less-than-one-pixel-basis changing on the image data on the continuous tone image. Since the direction of the interpolation performed in region 1 is upward and thus the interpolation is performed from the side of the succeeding line to the side of the preceding line, the interpolation processing for the line of interest is performed by conducting a weighting operation on the image data on the line of interest and the succeeding line. Although the weighting in this description is discussed such that, as shown by (b) in FIG. 8, the total of two pixels of the line of interest and the succeeding line in the subscanning direction to be operated is 16, the total of weighting coefficients in the present invention is not limited to 16. In order for the circuit used for the operation to be reduced, the total of weighting coefficients may be a power of two; in order for the operation to be performed more accurately, the operation may be performed with any coefficient. As the configuration of the weighting, a different weighting coefficient may be used for each pixel; a common weighting coefficient may be used for each unit of a plurality of pixels. Moreover, the corresponding number of pixels may be varied according to the value of the weighting coefficient. Since the changing point is defined as the position displaced one pixel in the subscanning direction with respect to the laser scan direction, the reference position at the time of the interpolation is assumed to be on the left side in the following description. For example, in the example of FIG. 8, for the region ranging from Pa to Pb, the reference position at the time of the interpolation is Pa on the left side.

An operation equation used in the interpolation is expressed as (equation 1):

(interpolation pixel value)=$W1\times$(pixel value in one line preceding the line of interest)+$W2\times$(pixel value of the line of interest)+$W3\times$(pixel value in one line succeeding the line of interest), where W1, W2 and W3 are any weighting coefficient. (Eq. 1)

A conceptual diagram of interpolation pixels obtained by (equation 1) above in the example described here is shown by (c) in FIG. 8. The (c) in FIG. 8 shows interpolation pixel values obtained by displacing line by line the lines of the image data show by (a) in FIG. 8 and then performing the above operation. When the interpolation according to (equation 1) is performed, before the changing point Pa, as pixels are closer to the changing point Pa, they are more affected by the pixel values of the succeeding lines whereas, as pixel are farther away from the changing point Pa, they are much more affected by the line of interest, that is, a black data line.

Behind the changing point Pa, as pixels are closer to the changing point Pa, they are more affected by the line of interest whereas, as pixel are farther away from the changing point Pa, they are more affected by lines behind the line of interest.

Then, the error diffusion processing part 602 performs halftoning by the error diffusion method, and the continuous tone image is converted into the halftone image as shown by (d) in FIG. 8. Here, it is found that, in the error diffusion method, the dots of the halftone are relatively diffused by the halftoning and thus intermediate density dots produced by the interpolation processing are unlikely to be separated.

Finally, as shown by (e) in FIG. 8, the memory part 108 performs the one-pixel-basis changing processing when the memory part 108 produces an output. Since more-than-one-pixel changing processing is performed at the time of reading from the memory part 108, existing large differences in height before and after the changing point Pa are eliminated here.

Region 2 of FIG. 7 needed to be corrected downward will now be described using FIG. 9. When a downward correction is performed, the interpolation is performed from the side of the preceding line to the side of the succeeding line, and thus the weighting coefficients used in the operation of the correction pixel values are set at the line of interest and the line preceding the line of interest.

In FIG. 9, the image data at the time of input to the continuous tone interpolation processing part 601 is shown by (a). The values of W1, W2 and W3 when the downward correction is performed are as shown by (b) in FIG. 9; for convenience of description, as in the upward correction processing, the total of the weighting coefficients is set at 16. When (equation 1) is also applied to the downward correction, the correction pixel values are determined with the changing point Pc being a boundary. Specifically, before the changing point Pc, as pixels are closer to the changing point, they are more affected by the pixel values of the succeeding lines whereas, as pixel are farther away from the changing point Pc, they are much more affected by the line of interest. Behind the changing point Pc, as pixels are closer to the changing point Pc, they are more affected by the line of interest whereas, as pixel are farther away from the changing point Pc, they are more affected by line preceding the line of interest ((c) in FIG. 9).

Then, the error diffusion processing part 602 performs halftoning by the error diffusion method, and the continuous tone image is converted into the halftone image as shown by (d) in FIG. 9. Here, intermediate density pixels produced by the interpolation processing are unlikely to be separated by the effects of the error diffusion method.

Finally, as shown by (e) in FIG. 9, the memory part 108 performs the one-pixel-basis changing processing when the memory part 108 produces an output. Since more-than-one-pixel changing processing is performed at the time of reading from the memory part 108, existing large differences in height before and after the changing point Pa are eliminated here.

As described above, whether the direction of the interpolation is upward or downward, in the interpolation processing performed by the continuous tone interpolation processing part 601, the pixel data continuous in the main scanning direction is prevented from appearing as large differences in height by differenced in height of the more-than-one-pixel changing processing.

The interpolation processing performed by the halftone interpolation processing part 604 will now be described in detail using FIGS. 7, 10 and 11.

Figure 10:
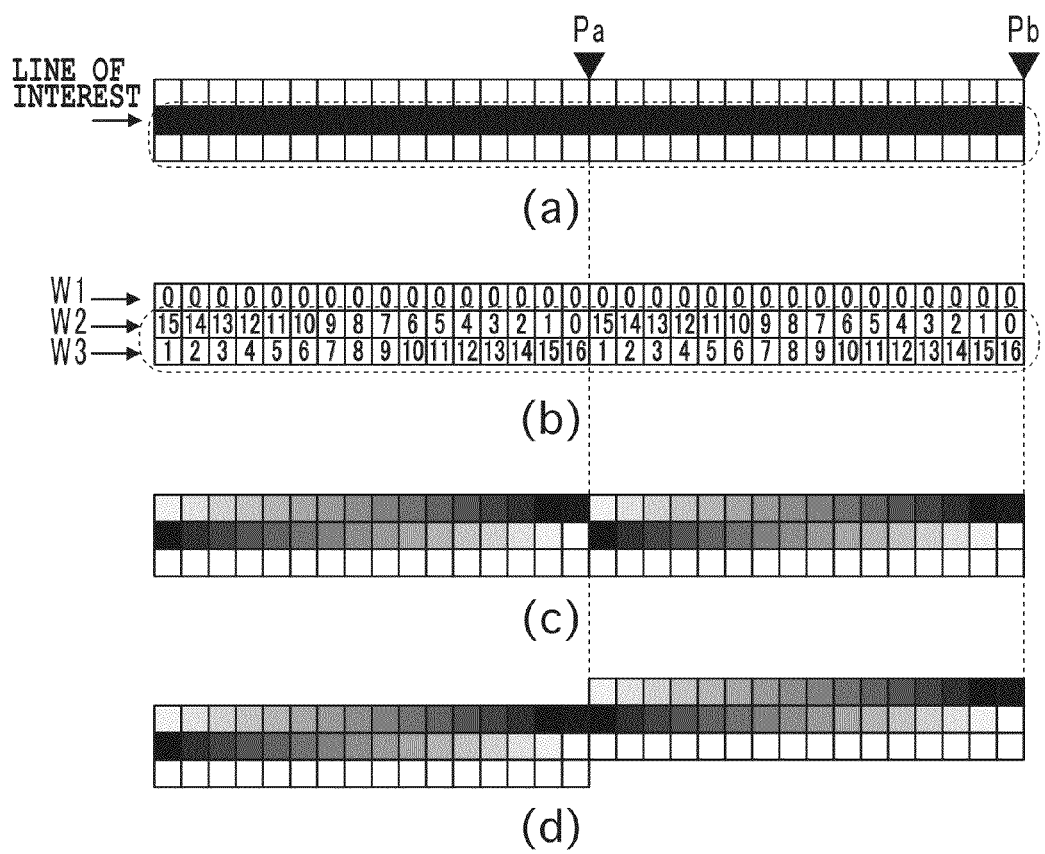
FIG. 10 is a diagram schematically showing processing on the pixel changing.

An image before the interpolation processing preceding and succeeding the changing point Pa in the example of FIG. 7, that is, the image data which is input to the halftone interpolation processing part 604, is shown by (a) in FIG. 10. The line of interest is the center line of the image data of three lines shown in the figure.

The halftone interpolation processing part 604 performs, on the line of interest, the interpolation processing for less-than-one-pixel-basis changing on the image data converted into the halftone image. Since the direction of the interpolation performed in region 1 is upward, the interpolation processing for the line of interest is performed by conducting a weighting operation with the image data on the succeeding line. The weighting in this embodiment is shown by (b) in FIG. 10; the image data output by the interpolation processing is shown by (c) in FIG. 10. Since the details of the interpolation processing performed by the halftone interpolation processing part 609 are the same as the continuous tone interpolation processing part 601, the description will not be repeated. Finally, as shown by (d) in FIG. 10, the memory part 108 performs the one-pixel-basis changing processing when the memory part 108 produces an output. Since more-than-one-pixel changing processing is performed at the time of reading from the memory part 108, existing large differences in height before and after the changing point Pa are eliminated here.

Region 2 of FIG. 7 needed to be corrected downward will now be described using FIG. 11. When a downward correction is performed, the weighting coefficients used in the operation of the correction pixel values are set at the line of interest and the line preceding the line of interest.

Figure 11:
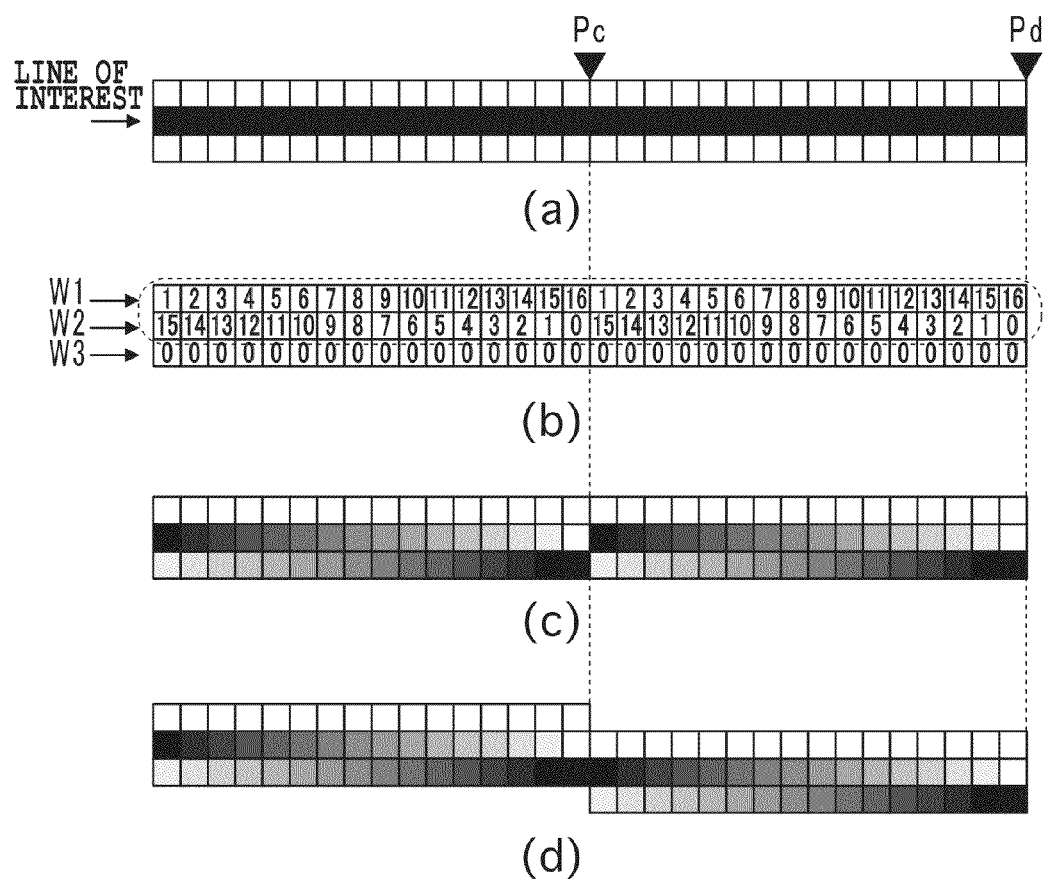
FIG. 11 is a diagram schematically showing processing on the pixel changing.

In FIG. 11, the image data at the time of input to the halftone interpolation processing part 604 is shown by (a). The values of W1, W2 and W3 when the downward correction is performed are as shown by (b) in FIG. 11; the image data on which the halftone interpolation processing part 604 performs the interpolation processing and which is output is shown by (c) in FIG. 11. Since the details of the interpolation processing performed by the halftone interpolation processing part 609 are the same as the continuous tone interpolation processing part 601, the description will not be repeated. Finally, as shown by (d) in FIG. 9, the memory part 108 performs the one-pixel-basis changing processing when the memory part 108 produces an output. Since more-than-one-pixel changing processing is performed at the time of reading from the memory part 108, existing large differences in height before and after the changing point Pa are eliminated here.

As described above, whether the direction of the interpolation is upward or downward, in the interpolation processing performed by the halftone interpolation processing part 604, the pixel data continuous in the main scanning direction is prevented from appearing as large differences in height by differenced in height of the more-than-one-pixel changing processing.

The results of the processing performed in this embodiment are now shown in FIGS. 13A to 13D and FIGS. 14A to 14D.

FIGS. 13A to 13D show an example of the results obtained by performing the interpolation processing and the halftoning in various orders on image data evenly coated at a density of 50%. FIGS. 14A to 14D show an example of the results obtained by performing the interpolation processing and the halftoning in various orders on image data drawn with thin lines having a density of 100%.

Figure 13A:
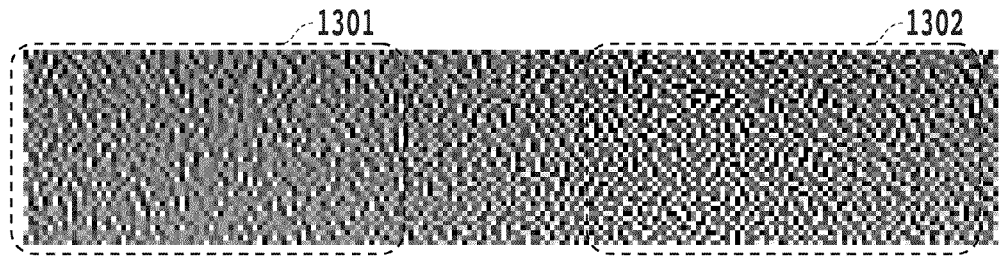
FIGS. 13A to 13D are examples of image data on which the pixel changing has been performed.
Figure 13B:
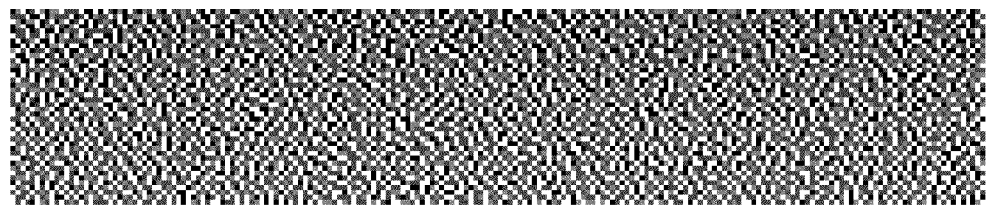

FIG. 13A shows an example of image data which has been subjected to the error diffusion processing and on which the interpolation processing for less-than-one-pixel-basis changing is thereafter performed. In FIG. 13A, unlike this embodiment, the interpolation processing is performed on the halftone image after the error diffusion processing. FIG. 13B shows an example of image data obtained by performing, as described in this embodiment, the interpolation processing on the continuous tone image before the error diffusion processing and thereafter performing the error diffusion processing. When these are compared, although even density is produced over the entire surface in FIG. 13A, dot shapes are completely different in regions 1301 and 1302. This is because the dots formed by the error diffusion method are relatively diffused; this occurs because its shape is likely to be significantly changed by the interpolation processing. These changes in dot shape occurring between the regions 1301 and 1302 cause large differences in density in the electrophotographic image forming apparatus. On the other hand, since, in FIG. 13B, the dot shape is not significantly changed over the entire surface, it is possible to achieve even density reproduction without the density being changed in any region.

Figure 13C:
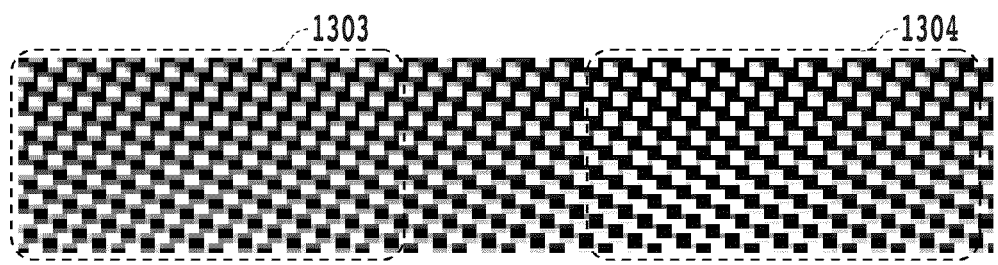
Figure 13D:
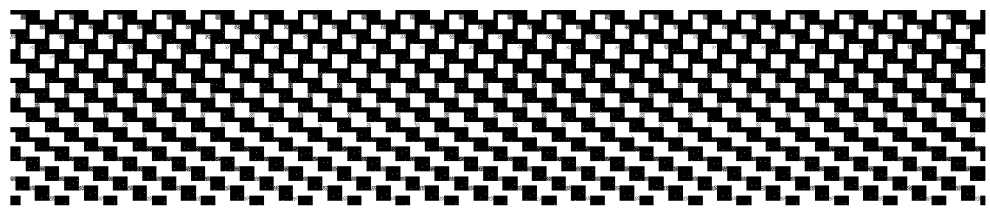

FIG. 13C shows an example of image data obtained by performing, as described in this embodiment, the screen processing and thereafter performing the interpolation processing on the halftone image. FIG. 13D shows an example of image data obtained by performing the interpolation processing on the continuous tone image before the screen processing and thereafter performing the screen processing. The comparison of these shows that, in FIG. 13C, the dot shape is slightly changed in regions 1303 and 1304 but is not destroyed, and no large difference is made between FIGS. 13C and 13D. This is because, since the dots formed by the screen processing are concentrated and are sufficiently large, they are unlikely to be affected by the interpolation processing.

Figure 14A:
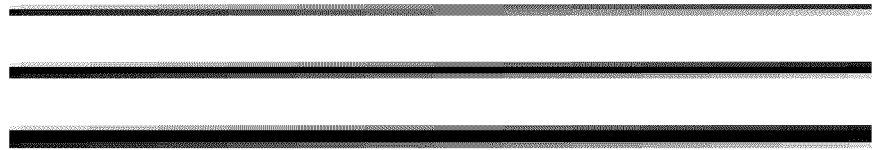
FIGS. 14A to 14D are examples of image data on which the pixel changing has been performed.
Figure 14B:
Figure 14C:
Figure 14D:

In FIG. 14A, as in FIG. 13A, the interpolation processing is performed on the halftone image converted by the error diffusion processing; in FIG. 14B, as in FIG. 13B, the interpolation processing is performed on the continuous tone image, and thereafter the error diffusion processing is performed. In FIG. 14C, as in FIG. 13C, the interpolation processing is performed on the halftone image converted by the screen processing; in FIG. 14D, as in FIG. 13D, the interpolation processing is performed on the continuous tone image, and thereafter the screen processing is performed.

In FIG. 14B, as described previously, even when the error diffusion processing is performed after the interpolation processing, the intermediate density pixels produced by the interpolation processing are unlikely to be separated, and the changing is naturally performed. On the other hand, in FIG. 14D, since the screen processing is performed after the interpolation processing, intermediate density parts produced by the interpolation processing are separated by the effects of the screen processing and appear uneven large edge parts. This is because the dots produced by the screen processing are so formed as to concentrate periodically. In FIG. 14C, since the interpolation processing is performed after the screen processing, this kind of phenomenon does not occur.

As described above, according to this embodiment, since the interpolation processing is performed on the continuous tone image preceding the halftoning for the error diffusion processing, it is possible to reproduce even density on the image data coated at an even density and prevent the image data on the thin lines from being separated. Since the interpolation processing is performed on the halftone image succeeding the halftoning for the screen processing, it is possible to reproduce the image data on the thin lines without being separated. Furthermore, since the one-pixel-basis changing is constantly performed on the halftone image having a smaller amount of data than the continuous tone image, it is possible to minimize the cost for the one-pixel-basis changing.

Embodiment 2

This embodiment differs from the embodiment described previously only in the configuration and operation of the HT processing part 107 of FIG. 1. Hence, the same parts as in the embodiment described previously are identified with common references numerals and their description will be repeated; only different parts will be described below. Embodiment 1 deals with the example where, when the error diffusion processing is used as the halftoning, the continuous tone interpolation processing is performed, and when the screen processing is used as the halftoning, the halftone interpolation processing is performed. Embodiment 2 deals with an example where, when the screen processing is used as the halftoning, if high screen ruling processing is performed, the continuous tone interpolation processing is performed or if low screen ruling processing is performed, the halftone interpolation processing is performed.

The configuration of the HT processing part 107 in this embodiment will be described below using FIGS. 15 and 16.

Figure 15:
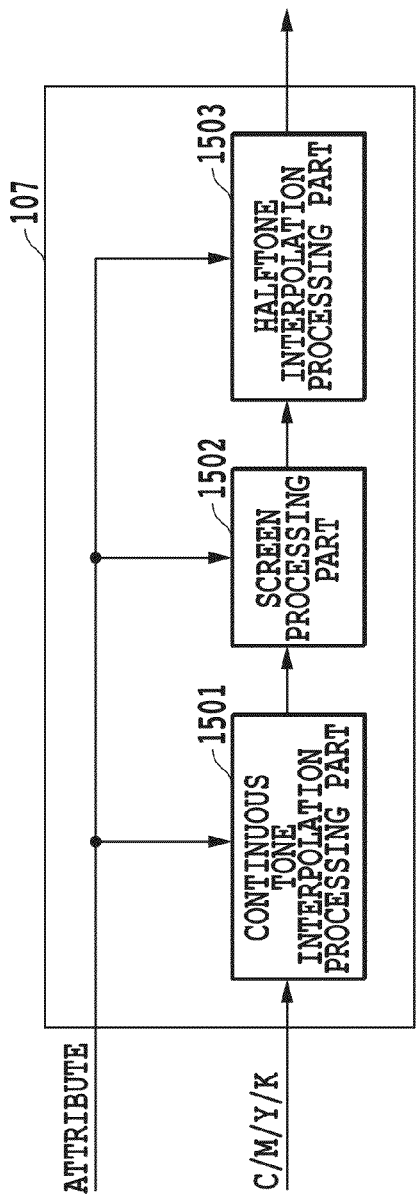
FIG. 15 is a block diagram showing a second configuration of the HT processing part.

FIG. 15 is a block diagram of the HT processing part 107 in this embodiment.

The HT processing part 107 receives image data corresponding to each color from the CMYK data and attribute data, and feeds the image data and the attribute data to a continuous tone interpolation processing part (third interpolation processing part) 1501. The continuous tone interpolation processing part 1501 performs the interpolation processing for less-than-one-pixel-basis changing on the continuous tone image. The continuous tone interpolation processing part 1501 also has the function of producing an output without performing the interpolation processing according to the attribute data. Since the details of the interpolation processing are the same as the continuous tone interpolation processing part 601, their description will not be repeated.

Then, a screen processing part (third halftone processing part) 1502 receives the image data and the attribute data, and performs the halftoning on the image data by the screen processing so as to convert the continuous tone image into the halftone image having a small number of tones. The screen processing part 1502 holds a plurality of dither matrixes, and selects and uses any dither matrix according to the attribute data.

Then, an halftone interpolation processing part (fourth interpolation processing part) 1503 performs the interpolation processing for less-than-one-pixel-basis changing on the halftone interpolation image whose number of tones has been reduced by the halftoning. The halftone interpolation processing part 1503 also has the function of producing an output without performing the interpolation processing according to the attribute data. Since the details of the interpolation processing are the same as the halftone interpolation processing part 604, their description will not be repeated.

The details of the operation of the HT processing part 107 in this embodiment will now be described using FIG. 16.

Figure 16:
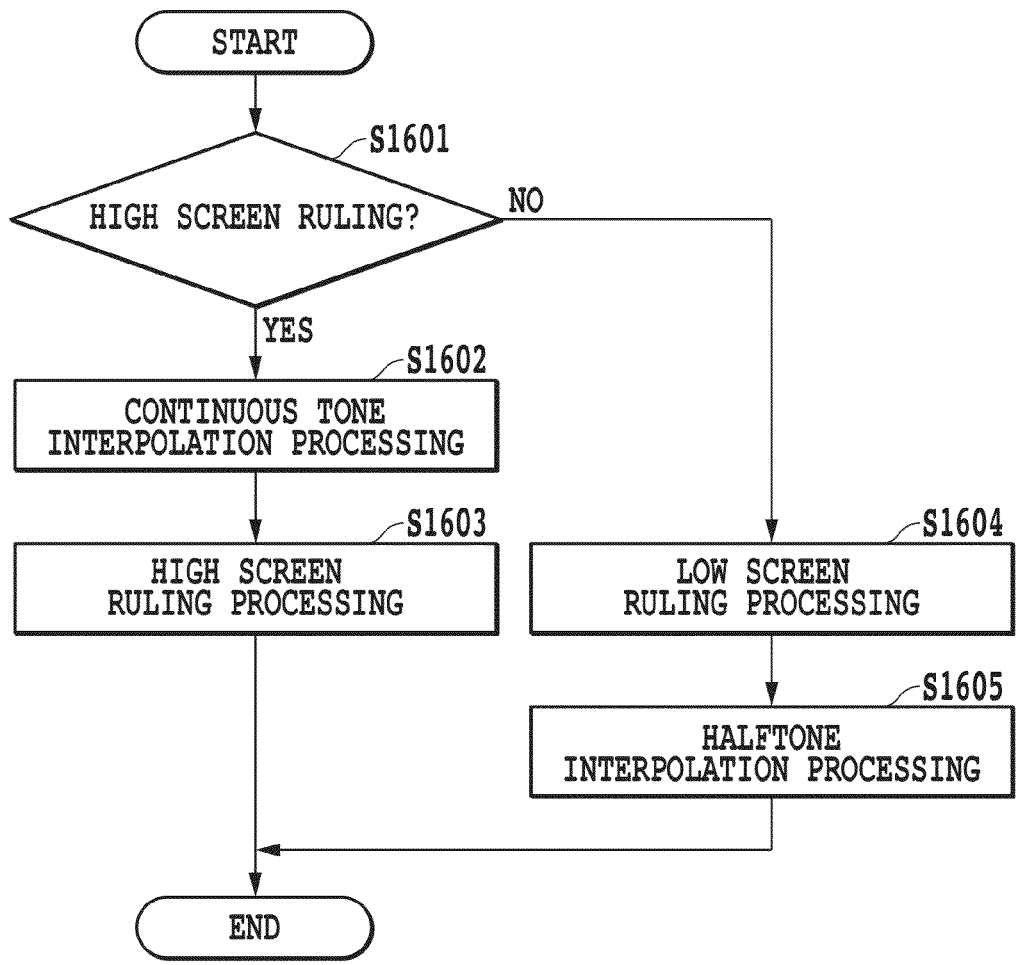
FIG. 16 is a flowchart showing the operation of the HT processing part of the second configuration.

FIG. 16 is a flowchart showing the operation of the HT processing part 107.

In step S1601, the continuous tone interpolation processing part 1501 determines from the attribute data the characteristic of spatial frequency of a dither matrix applied in the screen processing part 1502, and determines whether or not the interpolation processing is performed on the continuous tone image. The attribute data indicates the attribute of the image data, and holds information on characters, thin lines, CG and natural images for each pixel. The screen processing part 1502 selects one dither matrix on the attribute data from a plurality of dither matrixes, and performs the screen processing. In this embodiment, a high screen ruling dither matrix is applied to the image data having the attributes of characters and thin lines, and a low screen ruling dither matrix is applied to the image data having the other attributes of CG and natural images. The high screen ruling dither matrix has a high characteristic of spatial frequency (first characteristic of spatial frequency), and the low screen ruling dither matrix has a low characteristic of spatial frequency (second characteristic of spatial frequency). Thus, when the high screen ruling dither matrix has a high characteristic of spatial frequency, the process proceeds to step S1602 whereas, when this is not the case, the process proceeds to step S1604. In this embodiment, the high characteristic of spatial frequency refers to a dither matrix whose number of screen lines exceeds 200 lines.

Then, in step S1602, the continuous tone interpolation processing part 1501 performs the interpolation processing for less-than-one-pixel-basis changing on the continuous tone image before the halftoning.

Then, in step S1603, the screen processing part 1502 performs with the high screen ruling dither matrix the screen processing on the continuous tone image on which the interpolation processing has been performed, and converts it into the halftone image.

Then, in step S1604, the screen processing part 1502 performs with the low screen ruling dither matrix the screen processing on the continuous tone image on which the interpolation processing has not been performed, and converts it into the halftone image.

Then, in step S1605, the halftone interpolation processing part 1503 performs the interpolation processing for less-than-one-pixel-basis changing on the halftone image converted with the low screen ruling dither matrix.

Although this embodiment deals with the case where the attribute data indicates characters, thin lines, CG and natural images, the present invention is not limited to this. For example, other attributes of figures, tables and the like may be held. Although this embodiment deals with the case where two types of dither matrixes, that is, the low screen ruling dither matrix and the high screen ruling dither matrix are used, a plurality of dither matrixes other than those may be used. A dot diffusion dither matrix such as an FM screen may be used. Although the characteristic of spatial frequency is determined by the number of screens of the dither matrix, for example, the determination may be made by the characteristic of spatial frequency obtained by performing discrete Fourier transform or the like. Although this embodiment deals with the case where the high characteristic of spatial frequency indicates 200 lines or more, since the characteristic greatly varies depending on the image forming apparatus used, the high characteristic of spatial frequency may be determined by whether or not unevenness in density occur in the interpolation processing performed on the continuous tone image.

The results of the processing performed in this embodiment are now shown in FIGS. 13A to 13D, 14A to 14D, 17A, 17B and 18A and 18B.

Figure 17A:
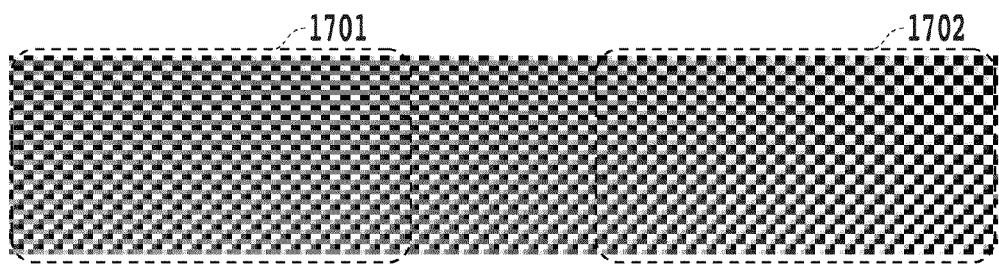
FIGS. 17A and 17B are examples of image data on which the pixel changing has been performed.
Figure 17B:
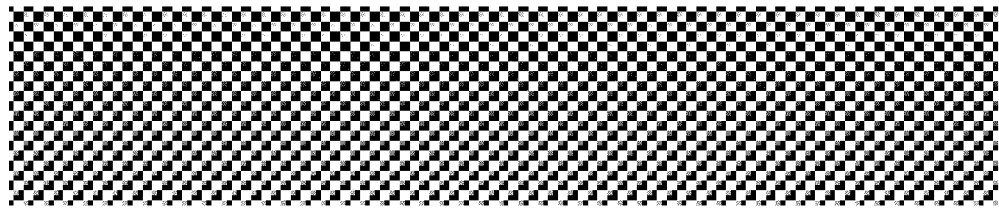
Figure 18A:
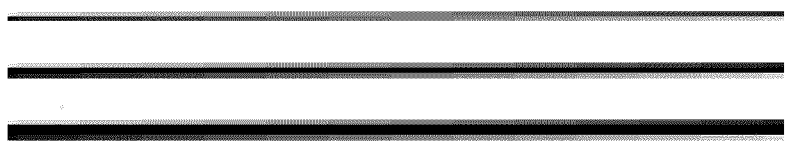
FIGS. 18A and 18B are examples of image data on which the pixel changing has been performed.
Figure 18B:
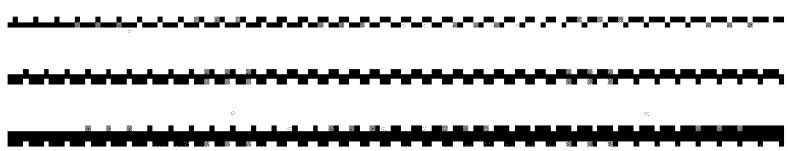

FIGS. 17A and 17B show an example of the results obtained by performing the interpolation processing and the halftoning in various orders on image data evenly coated at a density of 50%. FIGS. 18A and 18B show an example of the results obtained by performing the interpolation processing and the halftoning in various orders on image data drawn with thin lines having a density of 100%.

FIG. 13C shows an example of image data obtained by performing the interpolation processing on the halftone image on which the screen processing has been performed with a 134 line dither matrix. FIG. 13D shows an example of image data obtained by performing, with the 134 line dither matrix, the interpolation processing on the continuous tone image before the screen processing and thereafter performing the screen processing. The comparison of these shows that, in FIG. 13C, the dot shape is slightly changed in regions 1303 and 1304 but is not destroyed, and no large difference is made between FIGS. 13C and 13D. This is because, since the dots formed by the screen processing are concentrated and the characteristic of spatial frequency is sufficiently low, they are unlikely to be affected by the interpolation processing.

On the other hand, FIG. 17A shows an example of image data obtained by performing, with a 212 line dither matrix, the screen processing on the image data, and thereafter performing the interpolation processing for less-than-one-pixel-basis changing. In FIG. 17A, unlike in this embodiment, the interpolation processing is performed on the halftone image on which the screen processing has been performed using the high screen ruling dither matrix. FIG. 17B is an example of image data obtained by performing, as described in this embodiment, the interpolation processing on the continuous tone image on which the screen processing has not been performed using the high screen ruling dither matrix and thereafter performing the screen processing. When these are compared, although even density is produced over the entire surface in FIG. 17A, dot shapes are completely different in regions 1701 and 1702. This is because the dots formed by the high screen ruling dither matrix have a high characteristic of spatial frequency; this occurs because its shape is likely to be significantly changed by the interpolation processing. These changes in dot shape occurring between the regions 1701 and 1702 cause large differences in density in the electrophotographic image forming apparatus.

In FIG. 18A, as in FIG. 17A, the interpolation processing is performed on the halftone image converted by the screen processing with the high screen ruling dither matrix. In FIG. 18B, as in FIG. 17B, the interpolation processing is performed on the continuous tone image and thereafter performing the screen processing with the high screen ruling dither matrix.

In FIG. 18B, even when the screen processing is performed after the interpolation processing, since a dither matrix having a sufficiently high spatial frequency is used, the intermediate density pixels produced by the interpolation processing are unlikely to be separated, and the changing is naturally performed. On the other hand, in FIG. 14B, since the screen processing is performed with a dither matrix having a low spatial frequency after the interpolation processing, intermediate density parts produced by the interpolation processing are separated by the effects of the screen processing and appear uneven large edge parts. This is because the dots produced by the screen processing concentrate due to the low characteristic of spatial frequency. In FIG. 14C, since the interpolation processing is performed after the screen processing, this kind of phenomenon does not occur.

As described above, according to this embodiment, the characteristic of spatial frequency of the screen processing is determined, and, if the characteristic of spatial frequency is high, the interpolation processing is performed on the continuous tone image before the halftoning. Thus, it is possible to reproduce even density on the image data coated at an even density and prevent the image data on the thin lines from being separated. If the characteristic of spatial frequency is low, the interpolation processing is performed on the halftone image after the halftoning. Thus, it is possible to constantly reproduce the image data on the thin lines. Furthermore, since the one-pixel-basis changing is constantly performed on the halftone image having a smaller amount of data than the continuous tone image, it is possible to minimize the cost for the one-pixel-basis changing.

The embodiments described above deal with the examples of the tandem color image forming apparatus having as many developing machines and photoconductive drums as the number of colors of toner and sequentially transferring different color images on a recording medium. This is because the tandem color image forming apparatus uses as many lasers as the number of colors of toner and thus registration deviation is likely to occur. However, it goes without saying that the present invention can be applied to any image forming apparatus using a laser whether it is monochrome or color.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-254988, filed Nov. 6, 2009, which is hereby incorporated by reference herein in its entirety.

What is claimed is:

1. An image forming apparatus comprising:
an interpolation processing unit that performs less-than-one-pixel-basis pixel changing on image data having a number of tones of an M value;
a halftone processing unit that converts the number of tones from the M value to an N value (M>N) in the image data on which the less-than-one-pixel-basis pixel changing has been performed; and
a changing processing unit that performs one-pixel-basis pixel changing on the image data on which the less-than-one-pixel-basis pixel changing has been performed and which has been N-valued.

2. The image forming apparatus of claim 1, wherein the halftone processing unit converts the number of tones with a conversion method having low periodicity.

3. The image forming apparatus of claim 1, wherein the halftone processing unit uses an error diffusion method.

4. An image forming apparatus comprising:
a first interpolation processing unit that performs less-than-one-pixel-basis pixel changing on image data having a number of tones of an M value;
a first halftone processing unit that converts, with a conversion method having low periodicity, the number of tones from the M value to an N value (M>N) in the image data on which the less-than-one-pixel-basis pixel changing has been performed by the first interpolation processing unit;
a second halftone processing unit that converts, with a conversion method having higher periodicity than the first halftone processing unit, the number of tones from the M value to the N value in the image data having the number of tones of the M value;
a second interpolation processing unit that performs the less-than-one-pixel-basis pixel changing on the image data that has been converted into the N value by the second halftone processing unit; and
a changing processing unit that performs one-pixel-basis pixel changing on the image data on which the less-than-one-pixel-basis pixel changing has been performed and which has been N-valued.

5. The image forming apparatus of claim 4, wherein the first halftone processing unit uses an error diffusion method to convert the number of tones, and the second halftone processing unit uses a dither method to convert the number of tones.

6. The image forming apparatus of claim 4, further comprising:
a selection unit that performs control to select, according to attribute information on the image data, one of first image data obtained from the first interpolation processing unit and the first halftone processing unit and the second image data obtained from the second interpolation processing unit and the second halftone processing unit and to output the selected image data to the changing processing unit.

7. The image forming apparatus of claim 5, further comprising:
a selection unit that performs control to select, according to attribute information on the image data, one of first image data obtained from the first interpolation processing unit and the first halftone processing unit and the second image data obtained from the second interpolation processing unit and the second halftone processing unit and to output the selected image data to the changing processing unit.

8. An image forming apparatus comprising:
an interpolation processing unit that performs, when a characteristic of spatial frequency used in image data in which a number of tones is converted from an M value to an N value (M>N) is a first characteristic of spatial frequency higher than a predetermined value, less-than-one-pixel-basis pixel changing on the image data having the number of tones of the M value;
a halftone processing unit that converts, when the less-than-one-pixel-basis pixel changing is performed by the interpolation processing part, the image data of the M value on which the less-than-one-pixel-basis pixel changing has been performed into the image data of the N value having the first characteristic of spatial frequency and that converts, when the characteristic of spatial frequency used in the image data in which the number of tones is converted from the M value to the N value is a second characteristic of spatial frequency lower than a predetermined value, the image data of the M value on which the less-than-one-pixel-basis pixel changing has not been performed into the image data of the N value having the second characteristic of spatial frequency;
a second interpolation processing unit that performs the less-than-one-pixel-basis pixel changing on the image data of the N value which has been converted by the halftone processing unit and which has the second characteristic of spatial frequency; and
a changing processing unit that performs one-pixel-basis pixel changing on the image data on which the less-than-one-pixel-basis pixel changing has been performed and which has been N-valued.

9. The image forming apparatus of claim 8, wherein the characteristic of spatial frequency used in the image data in which the number of tones is converted from the M value to the N value is determined based on attribute information on the image data.

10. A method of forming an image comprising:
an interpolation processing step of performing less-than-one-pixel-basis pixel changing on image data having a number of tones of an M value;
a halftone processing step of converting the number of tones from the M value to an N value (M>N) in the image data on which the less-than-one-pixel-basis pixel changing has been performed; and
a changing processing step of performing one-pixel-basis pixel changing on the image data on which the less-than-one-pixel-basis pixel changing has been performed and which has been N-valued.

11. A method of forming an image comprising:
a first interpolation processing step of performing less-than-one-pixel-basis pixel changing on image data having a number of tones of an M value;
a first halftone processing step of converting, with a conversion method having low periodicity, the number of tones from the M value to an N value (M>N) in the image data on which the less-than-one-pixel-basis pixel changing has been performed by the first interpolation processing step;
a second halftone processing step of converting, with a conversion method having higher periodicity than the first halftone processing part, the number of tones from the M value to the N value in the image data having the number of tones of the M value;

a second interpolation processing step of performing the less-than-one-pixel-basis pixel changing on the image data that has been converted into the N value by the second halftone processing step; and a changing processing step of performing one-pixel-basis pixel changing on the image data on which the less-than-one-pixel-basis pixel changing has been performed and which has been N-valued.

* * * * *